United States Patent [19]

Nakagawa

[11] 3,801,345

[45] Apr. 2, 1974

[54] PROCESS FOR PRODUCING CEMENT EXPANDING AGENTS

[75] Inventor: Koji Nakagawa, Asahi, Japan

[73] Assignee: Denki Kagaku Kogyo Kabushiki Kaisha, Tokyo, Japan

[22] Filed: Mar. 30, 1971

[21] Appl. No.: 129,420

[52] U.S. Cl. ................................ 106/314, 106/89
[51] Int. Cl. .............................................. C04b 13/22
[58] Field of Search .............. 106/86, 103, 104, 314

[56] References Cited
UNITED STATES PATENTS

| | | | |
|---|---|---|---|
| 3,666,515 | 5/1972 | Nakagawa | 106/104 |
| 3,510,326 | 5/1970 | Miki | 106/104 |
| 3,303,037 | 2/1967 | Klein | 106/104 |
| 3,251,701 | 5/1966 | Klein | 106/104 |
| 3,155,526 | 11/1964 | Klein | 106/103 |

*Primary Examiner*—James E. Poer
*Attorney, Agent, or Firm*—Sughrue, Rothwell, Mion, Zinn & Macpeak

[57] ABSTRACT

Cement expanding agent is produced by burning a raw mixture containing $CaO$, $Al_2O_3$, $SO_3$ and $F$, wherein the weight ratio of $CaO/Al_2O_3$ is 0.5 to 20, 0.2 to 20 percent by weight of an inorganic fluoride and 30 to 80 percent by weight of $CaSO_4$ are contained, in a directly heating electric resistance furnace at the electrode AC voltage of 20 to 400 V and the electrode current density of 0.8 to 8.0 Amp./cm$^2$ and cooling the fused body under a particular condition.

10 Claims, 6 Drawing Figures

$2\theta - CuK\alpha$

PROCESS FOR PRODUCING CEMENT EXPANDING AGENTS

The present invention relates to a process for producing cement expanding agents, which is characterized in that a raw mixture containing CaO, $Al_2O_3$, $SO_3$ and F as the chemical components is heated and fused in a directly heating electric resistance furnace and the fused body is cooled under a particular condition.

Heretofore, the cement expanding agent consisting essentially of CaO, $Al_2O_3$ and $SO_3$ has been produced in industry in a rotary kiln but in a short period of time after the starting of the operation, the growth of a ring at the burning zone in the kiln is intensive and the continuous operation cannot be carried out.

An object of the present invention is to solve such a defect.

For the purpose, the first means is to define the chemical composition ratio of the raw mixture. Namely, the raw mixture is constituted with the weight ratio of CaO to $Al_2O_3$ of 0.5 to 20, 0.2 to 20 percent by weight of an inorganic fluoride and 30 to 80 percent by weight of $CaSO_4$. The raw mixture is fused in a directly heating electric resistance furnace.

Furthermore, the present invention is characterized in that the cement expanding agents having the mineral compositions of different constitutions and different crystals can be obtained by cooling the fused body in a variety of manners and this point is a noticeable difference from the conventional process.

When the weight ratio of CaO to $Al_2O_3$ in the raw mixture is beyond the range from 0.5 to 20, the properties of the quality is considerably deteriorated. Namely, in the case of less than 0.5, unreacted alumina ($Al_2O_3$) increases, while in the case of more than 20, free calcium oxide (abridged as F-CaO) increases and the stability becomes poor. The definition of $CaSO_4$ to 30 to 80 percent by weight based on the total amount is based on the following reason. Since the raw mixture is fused in the directly heating electric resistance furnace, the formation of $SO_3$ due to the decomposition increases. Namely, in the case of less than 30 percent, the melting point rises and the generation of $SO_3$ is intensive, while in the case of more than 80 percent, the quality of the cement expanding agent lowers.

The addition of the inorganic fluoride provides an absolutely necessary effect in the second means (burning process) as mentioned hereinafter. The effect does not appear in less than 0.2 percent, while when exceeding 20 percent, the quality as the cement expanding agent lowers considerably.

The term "inorganic fluorides" used herein means metal compounds containing fluorine or may be the metal compounds, wherein fluorine exists as a coordinate in a complex group, for example, $CaF_2$ (fluorite), $Na_3AlF_6$ (cryolite) and the like, which can be decomposed or sublimated at a temperature of higher than 800° C. The substances, which generate gas at such a temperature, are not preferable. It has been confirmed that $K_2SiF_6$, $AlF_3$, $MgF_2$, $BaF_2$, $CrF_3$, $FeF_3$, $ZnF_2$ and the like show substantially the same function.

In the practice of the first means, that is the compounding of the raw mixture, white bauxite and red bauxite are most preferable as the alumina and in addition use may be made of the calcined products of raw materials containing a large amount of alumina, such as alunite, kaolinite, aluminous shale, diaspore and the like and metallic aluminum and aluminum nitride are more preferable alone or in admixture. The metallic aluminums include processing scrap of metallic aluminum and aluminum containing ash, which is by-produced in aluminum smelting and also aluminum nitride is generally contained in aluminum containing ash and is advantageous, because the cost of the raw mixture is remarkably reduced. The metallic aluminum generates the reaction heat due to the oxidation in the course of the subsequent heat treatment and reduces the amount of electric power consumed. Moreover, aluminum nitride improves the fluidity of the fused body and has an excellent function in view of the stable and continuous furnace operation.

However, the compounding ratio of metallic aluminum or aluminum nitride in the raw mixture is preferred to be 0.2 to 20 percent by weight, because the amount of less than 0.2 percent, cannot attain the above described function, while in the amount of more than 20 percent, the unreacted aluminum nitride remains in the product and therefore when the expanding agent is compounded in a cement, a hydrolysis occurs in the course of hydration and ammonia gas ($NH_3$) is generated and such an amount is not preferable.

As the calcium oxide material, use may be made of any substances containing a large amount of CaO. As gypsum material use may be made of any of natural materials and chemical by-products, if such materials contain a large amount of $CaSO_4$. It is preferable for the stabilization in the following fusing step that the amount of the volatile substances contained in these raw materials, which volatilize at a temperature of lower than 150°C, are small as far as possible.

According to the present invention, the grain size of each raw material is defined in order that the raw mixture having the above described composition ratio can enhance the reaction ratio of alumina and stabilize the quality and enable the continuous operation for a long period of time. It has been found that it is important to balance the average grain sizes of alumina raw material and calcium oxide raw material and the pore volume of the particle assembly.

For example, an explanation will be made with respect to the alumina raw material. When alumina raw material having an extremely large average grain size is used, even if the raw mixture could be burnt, a large amount of unreacted $Al_2O_3$ remains in the fused body. When the average grain size of the alumina raw material is extremely small, the reaction is rapidly completed but the viscosity of the fused body increases rapidly, the fluidity decreases, the escape of $SO_3$ is intensive and the tapping of the fused body from the reaction system becomes very difficult. Accordingly, in the present invention, the average grain size and the pore volume of the alumina raw material are adjusted to be less than 5 mm and 0.05 to 0.5 cm³/g respectively and the grain size of the calcium oxide raw material is adjusted to be 1 to 10 times of the average grain size of the alumina raw material. When the average grain size of the calcium oxide raw material based on the average grain size of the alumina raw material is less than 1, the viscosity of the fused body increases and the tapping is difficult, while when said average grain size value is more than 10, the reaction rate lowers and the heating must be effected for a long time and these sizes are not preferable.

The "pore volume" used herein is shown by the volume of the total fine pores within the range of 75A. to 75,000 A. per unit weight of the powder sample and is measured by the mercury porosimeter.

The average grain size is defined by the maximum value of the grain size distribution.

The second means comprises fusing the above described raw mixture by means of the directly heating electric resistance furnace.

The term "electric furnace" used herein is the furnace in which the raw material is directly heated by using the fused raw mixture as an electric resistor and generally a carbon electrode is used and the furnace has the same system as the furnace for producing calcium carbide or ferroalloy.

The other melting furnaces, for example, a low frequency induction furnace or a high frequency induction furnace may be used but these furnaces need a high cost for electric power and are not advantageous economically.

The temperature of the fused body varies depending upon the chemical composition of the raw mixture but the inventor has studied in detail the mechanism of the fusion reaction of the ternary system of $CaO-Al_2O_3-CaSO_4$ and as the result it has been found that the reaction rate of alumina is improved, the viscosity increases rapidly and the fluidity lowers.

The fused body near the electrode is over heated locally and the escape of $SO_3$ is intensive, so that it is necessary to improve the fluidity of the fused body.

The inventor has succeeded in the improvement of the fluidity by adding 0.2 to 20 percent by weight of an inorganic fluoride to the raw mixture and the escape of $SO_3$ has been completely prevented. Thus the reaction rate of alumina can be considerably improved. Since the fluidity is improved, the tapping of the fused body from the furnace has become very easy and an important effect has been developed in the course of cooling, which is the third means. The amount of the inorganic fluoride added is adjusted so as to keep the temperature of the fused body within the range of 1,450° to 1,100°C, whereby the temperature of the fused body can be maintained stably and constantly, even if the variation of the electrode voltage and current occurs.

The term "electrode voltage" used herein means the voltage at the top of the electrode and AC voltage of 20 to 400 V is most preferable. The voltage of less than 20 V is not preferable in view of the heat efficiency, while the voltage of more than 400V generates arc intensively and the temperature becomes unusually high and the escape of $SO_3$ occurs and these voltages are not preferable.

By the process as described above in detail, the previous defects can be removed and the continuous operation for a long period of time can be effected stably.

When the fused body in the furnace becomes higher than 1,450°C, the escape of $SO_3$ begins. In general, the desulfuric acid decomposition reaction of anhydrous gypsum occurs at a temperature within the range of 1,380° to 1,300°C but the inventor has found that when gypsum coexists in the raw mixture, $CaSO_4$ in gypsum forms an eutectic composition together with the free CaO and the fluoride and is stabilized and therefore the temperature for starting the decomposition rises to about 1,450°C even in the fused state under a reducing atmosphere. However, when the load voltage and the electrode current density are not proper, the temperature of the fused body is often unusually raised and the escape of $SO_3$ occurs intensively and the chemical composition of the fused body changes and the fluidity is lost.

The inventor has studied in order to solve this problem and it has been found that the electrode current density is most preferred to be 0.2 to 8 Amp./cm². In less than 0.2 Amp./cm², the production efficiency per unit hour lowers and the efficiency of the electric furnace lowers, while in more than 8 Amp./cm², the operation is unstable, the blowing up phenomenon of the fused body is noticeable and so called "flicker" phenomenon occurs.

Then, an explanation will be made with respect to the cooling process, which is the third means. As mentioned above, the composition of the fused body can be freely varied by the variation of the cooling process.

The first process is as follows:

The fused body is flown out and taken on an iron ladle, of which the space between double walls is filled with silica, natural sand, zeolite and the other refractory insulating materials and an upper cover is put on the ladle and the fused body is left to stand. By such a treatment, the cement expanding agent consisting mainly of the mineral composition of $C_{12}A_7$-CaO-$CaSO_4$ is obtained.

The second process is as follows:

The fused body is flowed out into an iron ladle provided with no insulating material or a metal mold ingot and cooled naturally. In this case the cement expanding agent consisting mainly of the mineral composition of $C_{12}A_7$-$C_4A_3\bar{S}$-CaO-$CaSO_4$ is obtained.

The above described two cooling processes are referred to as "gradual cooling" and if the raw mixture is within the range of ABCD shown in FIG. 1, which is the range of the chemical composition of the present invention, these cooling processes are applicable. The range shown by EJKH is preferable in view of the quality. In the range of JFGK, F-CaO is little and therefore the product which is hardly weathered, is obtained. In this case, $C_{12}A_7$-$CaSO_4$ is main and F-CaO is little and particularly on the line of X-Y, the cement expanding agent containing no CaO can be obtained. In this range, the product which cannot only expand cement but also improve the initial strength of cement, is obtained and accordingly this range is distinguished from the range of EJKH in view of the quality. In the range of EFGH, the addition of the fluoride is sufficient in an amount of 0.2 to 5 percent by weight. $C_{12}A_7$ and $C_4A_3\bar{S}$ mean $12CaO \cdot 7Al_2O_3$ and $3CaO \cdot 3Al_2O_3 \cdot CaSO_4$, respectively.

The inventor has confirmed that the ratio of $C_{12}A_7$ to $C_4A_3\bar{S}$ of the mineral composition of the fused body can be optionally varied by controlling the cooling rate of the fused body and the amount of the inorganic fluoride added.

Namely, a phase equilibrium is established as shown in the following equation.

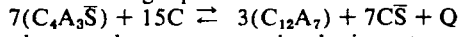

In the actual measurement by the inventor, when Q in the above equation is assumed to be 38 Kcal and the cooling rate of the fused body is low, the phase equilibrium transfers to the right side.

The present invention has been accomplished based on the discovery of such a fact and even if the fused body is treated by the same cooling process, the composition ratio of $C_{12}A_7$ to $C_4A_3\bar{S}$ varies depending upon the content of fluorides.

The relation of the cooling rate and the amount of fluorite to the formation ratio of $C_{12}A_7$-$C_4A_3\bar{S}$ is shown by the graph in FIG. 2. The chemical composition of the raw mixture is adjusted to the mole ratio of $CaO:Al_2O_3:CaSO_4$ being 4:1:3 and 0(D), 1(A), 3(B) and 5(C) percent by weight of natural fluorite are added thereto respectively. The case when the fluorite is not added, is shown by the curve D and the composition of the product is not significantly changed by the variation of the cooling rate but when the fluorite is added, for example, when 1 percent of fluorite is added, even if the cooling rate is the same as in the case of no addition of fluorite, the product wherein the ratio of $C_4A_3\bar{S}$ decreases and adversely the ratio of $C_{12}A_7$ increases as shown by the curve A, is produced. Furthermore, the smaller the cooling rate, the more intensive the tendency is and the larger the amount of fluorite added (curve $B = 3$ percent, curve $C = 5$ percent), the more noticeable said tendency is. It has been confirmed that this tendency is substantially the same as in the natural fluorite with respect to the test of the other inorganic fluorides.

The composition ratio of $C_4A_3\bar{S}$ to $C_{12}A_7$ means the ratio of $C_4A_3\bar{S}$ to $C_{12}A_7$ in the alumina containing mineral excluding CaO, $CaSO_4$ and a trace of $C_4AF$, $C_2S$ and vitreous substances and the quantitative analysis of both the components was effected by means of X-ray diffraction. $C_4AF$ means $4CaO \cdot Al_2O_3 \cdot Fe_2O_3$ and $C_2S$ means $2CaO \cdot SiO_2$.

The quantitative analysis was referred to N. Fukuda, J. Ceram. Assoc. Japan, p. 187–191, 69(6), 1961, and was determined from X-ray diffraction intensity ratio based on $C_4A_3\bar{S}$ and $C_{12}A_7$, which are synthesized from the pure chemicals, by adding 20 percent by weight of KCl as the internal standard substance.

The thus obtained cooled body is milled and added to a cement to form an expansive cement, which has a unique property. Namely, the minerals of $C_4A_3S$ and $C_{12}A_7$ have been heretofore known in the type of coexistence of $CaSO_4$ or CaO and $CaSO_4$ and have been used practically but when they are mixed with cement, water and sand, $C_{12}A_7$ series agent is good in the expandability in the original hydration but is too earlier in practice in the setting time. On the contrary, the setting time of $C_4A_3\bar{S}$ series agent is not different from that of usual Portland cement. The cement expanding agent according to the present invention possesses the merits of both the agents and has improved properties. When the composition ratio of $C_{12}A_7$ becomes predominant, F-CaO is little or if the raw mixture is compounded in the stoichiometric amount within the range as shown in JFGK in FIG. 1, the cement expanding agent consisting mainly of $C_{12}A_7$-$CaSO_4$ and containing no F-CaO can be obtained. The common characteristics of these agents consist in that they are hardly weathered, and have a high stability, which are different from the conventional agents. 9 percent by weight of various cement expanding agents having different contents of $C_4A_3\bar{S}$ and $C_{12}A_7$ were compounded with usual Portland cement and the mixture was determined with respect to the free expansion coefficient of mortar according to JIS R 5201 and the result is shown in FIG. 3.

As seen from this result, the maximum effect to the expansion coefficient is obtained at the composition ratio of $C_{12}A_7$ to $C_4A_3\bar{S}$ of 2:8 – 8:2, so that the corresponding cooling rate of the fused body is preferred to be within the range of 2° to 20°C/min.

However, such a correct measurement of the cooling rate is difficult and therefore in the practice the cooling is effected by the above described cooling processes 1 and 2 and the fused body is taken out on the ladle and the temperature is adjusted by keeping the temperature from the outside, if necessary or by cooling by air. In short, the cooling is essentially necessary until $C_{12}A_7$ is formed and after the formation, the gradual cooling is not always necessary and the treatment is effected so as to meet the practical operation.

The third cooling process involves discharging and blowing out the fused body into a compressed air of a pressure of 1 to 20 Kg/cm² to effect a quenching. The resulting cooled body can be obtained freely from lump to particle by varying the air pressure and the shape of air flow (for example, the size and shape of nozzle). The cooled body obtained in this manner consists mainly of $C_4A_3\bar{S}$ and does not contain $C_{12}A_7$.

The chemical composition within the range of EFGH in FIG. 1 provides the product consisting mainly of $C_4A_3\bar{S}$-CaO-$CaSO_4$ or $C_4A_3\bar{S}$-$CaSO_4$ but as the grain size of the cooled body becomes smaller, the amorphous portion increases and the characteristic diffraction ray of F-CaO remains according to X-ray diffraction and the diffraction pattern of the other minerals are not substantially shown. This tendency is particularly distinct in the case of the grain size of less than 5 mm and the cement expanding agent, of which the hydration reaction is very slow, is formed. Accordingly, said agent can be utilized as a non-shrinkable cement in the practice and when said expanding agent is applied to the plaster, the shrinking cracks can be prevented. The product having a grain size of more than 5 mm can be practically used as the excellent cement expanding agent. This agent is somewhat slower in the hydration rate than the conventional expanding agents and shows the expandability for a long period of time. If an explanation will be made with respect to an embodiment having the chemical composition of mole ratio of $CaO:Al_2O_3:CaSO_4$ being 4:1:3, said agent shows the expansion state as shown by the curve 2 in FIG. 4. The curve 2 shows the case when a mortar sample defined in JIS R 5201 (7 percent by weight of cement expanding agent is compounded to usual Portland cement) is cured in water and even when the sample is left to stand in air (RH70 to 80 percent) after one week of the water curing, the shrinkage does not occur as shown by the curve 2′ (the sample after cured for one week in water is the standard). The curve 1 shows the expansion state in the case when the expanding agent obtained by burning the raw mixture having the same chemical composition as described above is used and the sample was cured in water for the total period of time and the curve 1′ shows the expansion state when said sample is left to stand in air after one week of the water curing. The curve 3′ shows the expansion state when usual Portland cement is cured in water for the total period of time. The curve 3 will be explained hereinafter.

As seen from the comparative examples, even if the cement expanding agent according to the present invention contains the same amount of F-CaO as the conventional agent, it shows considerably unique properties and this is an important merit of the present invention.

The gas pressure in the blowing away cooling process has relation to the tapped amount of the fused body and cannot be determined in general but in the case of less than 1 Kg/cm², even if said amount is smaller, the pressure is not sufficient to blow away the fused body, while in the case of more than 20 Kg/cm², the fused body is extremely cooled and the resulting minerals are amorphous and the desired expandability cannot be attained.

The fourth cooling process involves cooling the fused body with water and removing water rapidly.

There are various means for carrying out this process, for example, directly pouring out process, a process wherein the used body is flowed out on a conveyor or rollers and water is sprayed or showered on the fused body and the like. However, when the fused body is contacted with water for a long time, it is hydrated. Accordingly, it is necessary to separate rapidly water from the cooled body after the cooling. The cooled body in this process shows the expandability as shown by the curve 3 in FIG. 4 and particularly when it is applied to the plastering mortar, the cracking, which is observed in the conventional products, can be prevented and in the other applications, the ideal non-shrinkable cement, which does not show the volume variation, can be obtained.

For a better understanding of the invention, reference is taken to the accompanying drawings, wherein.

The following examples are given for the purpose of illustration of this invention and are not intended as limitations thereof.

EXAMPLE 1

Quick lime, bauxite and gypsum having chemical compositions as shown in the following Table 1 were used as raw materials. 31.9 percent by weight of the quick lime, which passed wholly through a 2 mm mesh sieve and had an average grain size of 0.5 mm, 11.0 percent by weight of the bauxite having an average grain size of 0.13 mm and a pore volume of 0.141 cm³/g, 90 percent of which passed through a 0.25 mm mesh seive, 57.0 percent by weight of the gypsum, which was a by-produced anhydrous gypsum in a chemical reaction, and 1.5 percent by weight of cryolite were compounded to prepare a raw mixture.

The chemical compositions of the raw materials are shown in the following Table 1. In Table 1, the numeral means percent by weight.

Table 1

| | Ig. loss | $Al_2O_3$ | CaO | $SO_3$ | $SiO_2$ | $Fe_2O_3$ | Others | Total |
|---|---|---|---|---|---|---|---|---|
| Quick lime | — | 0.5 | 95.7 | 0.2 | 0.4 | 1.9 | 0.8 | 99.5 |
| Bauxite | 0.3 | 86.2 | 0.3 | — | 3.9 | 5.5 | 3.4 | 99.6 |
| Gypsum | 1.7 | 0.3 | 39.4 | 57.8 | 0.3 | 0.1 | 0.3 | 99.6 |

The above described raw mixture was fused under the following condition by means of a directly heating electric resistance furnace provided with three graphite electrodes and having a maximum load power of 2,000 KVA.

Electrode voltage — 90–250 V
Electrode current density — 1–5A/cm²
Equivalent resistivity — 3–9Ω
Temperature of the fused body — 1,250° to 1,420°C The resulting fused body was tapped from the furnace and cooled according to the following four processes.

Figure 5:
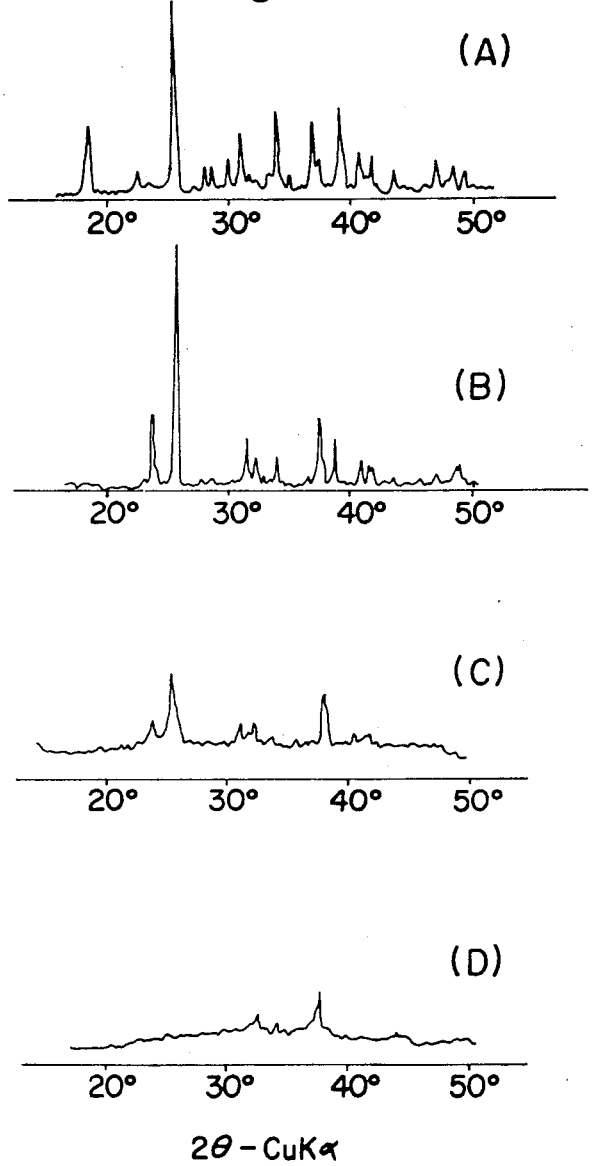
FIG. 5 is X-ray diffraction patterns of the cooled body obtained by the present invention.

1. The fused body was poured into a crucible-shaped and double-walled iron ladle having an inner capacity of about 0.3 m³, which had been filled with natural sand between the two walls, and the ladle was covered and left to stand.
   The X-ray diffraction pattern of the resulting cooled product was composed of $C_{12}A_7$, CaO and $CaSO_4$ as shown in FIG. 5A.

2. The fused body was poured into a box-shaped cast iron metal pattern having an inner capacity of 0.7 m³, so that the thickness of the fused body was 20 cm and then left to stand.
   The cooled product had a composition ratio of $C_{12}A_7:C_4A_3\bar{S} = 4:6$.

3. Compressed air was blown to a flow of the fused body from the back side of the flow through a flat nozzle having a major axis of 45 mm and arranged under the outlet of the furnace under a gauge pressure of 3 to 10 Kg/cm², and the fused body was scattered in a cooling iron rotary drum to obtain a granular cooled product. The granules were seived by means of a 5 mm mesh sieve. The X-ray diffraction pattern of the granules passed through the sieve and that of granules not passed through the sieve are shown in FIGS. 5B and 5C, respectively.

4. The fused body was poured between two rotary drums rotating in the opposite direction and arranged under the outlet of the furnace, which drums were similar to a Bessemer twin roll type cooling and coagulationg roll and cooled with water in the interior, and at the same time water was sprayed on the fused body, and then the fused body was passed between the two drums together with the water to obtain a flaky cooled product. The flaky cooled product was separated from the water.
   The X-ray diffraction pattern of the resulting flaky cooled product is shown in FIG. 5D.

Chemical analysis showed that all the cement expanding agents obtained by the above described four cooling processes and having the X-ray diffraction patterns shown in FIGS. 5A, 5B, 5C and 5D had the same composition as shown in the following Table 2. In Table 2, the numeral means percent by weight.

Table 2

| Insoluble | SiO$_2$ | Al$_2$O$_3$ | Fe$_2$O$_3$ | CaO | MgO | SO$_3$ | TiO$_2$ | Total |
| --- | --- | --- | --- | --- | --- | --- | --- | --- |
| 0.1 | 1.4 | 11.3 | 0.8 | 53.4 | 0.5 | 31.4 | 0.3 | 99.2 |

EXAMPLE 2

Raw materials having the same compositions as shown in Table 1 were used. However, as the bauxite, one having previously been pulverized by a ball mill so as to adjust the average grain size to be 5.5 mm and having a pore volume of 0.01 m$^3$/g measured by a mercury porosimeter was used. The raw materials and cryolite were compounded in the same recipe as described in Example 1 and fused under the same condition as described in Example 1. Chemical composition of the resulting cooled product is shown in the following Table 3. In Table 3, the numeral means percent by weight.

Table 3

| Insoluble | SiO$_2$ | Al$_2$O$_3$ | Fe$_2$O$_3$ | CaO | MgO | SO$_3$ | TiO$_2$ | Total |
| --- | --- | --- | --- | --- | --- | --- | --- | --- |
| 3.9 | 1.4 | 7.3 | 0.9 | 53.6 | 0.5 | 31.5 | 0.3 | 99.4 |

EXAMPLE 3

Raw materials having the same compositions as shown in Table 1 and aluminum containing ash having a composition shown in the following Table 4 (the numeral in Table 4 means percent by weight) were compounded in the following recipe.

|  | % by weight |
| --- | --- |
| Quick lime | 31.5 |
| Bauxite | 7.9 |
| Aluminum containing ash | 4.9 |
| Gypsum | 55.7 |

The resulting raw mixture was fused under the same condition as described in Example 1. The fused body had a temperature of 1,350°C and had a very good fluidity.

Chemical composition of the resulting cooled product is shown in the following Table 5. In Table 5, the numeral means percent by weight.

Table 4

| Al$_2$O$_3$ | F$_2$ | N$_2$ | SiO$_2$ | Fe$_2$O$_3$ | Al | Total |
| --- | --- | --- | --- | --- | --- | --- |
| 80.0 | 5.0 | 3.5 | 0.5 | 0.3 | 10.0 | 99.3 |

Table 5

| Insoluble | Al$_2$O$_3$ | SO$_3$ | CaO | SiO$_2$ | Fe$_2$O$_3$ | MgO | TiO$_2$ | Total |
| --- | --- | --- | --- | --- | --- | --- | --- | --- |
| 0.2 | 12.0 | 32.9 | 51.5 | 1.3 | 0.8 | 0.7 | 0.3 | 99.7 |

Nitrogen content in the cooled product was analysed by a Kjieldahl method, but nitrogen was not detected.

EXAMPLE 4

To the same raw materials as used in Example 1 were added 0, 1, 3 and 5 percent by weight of fluorite to prepare four kinds of raw mixtures.

Figure 2:
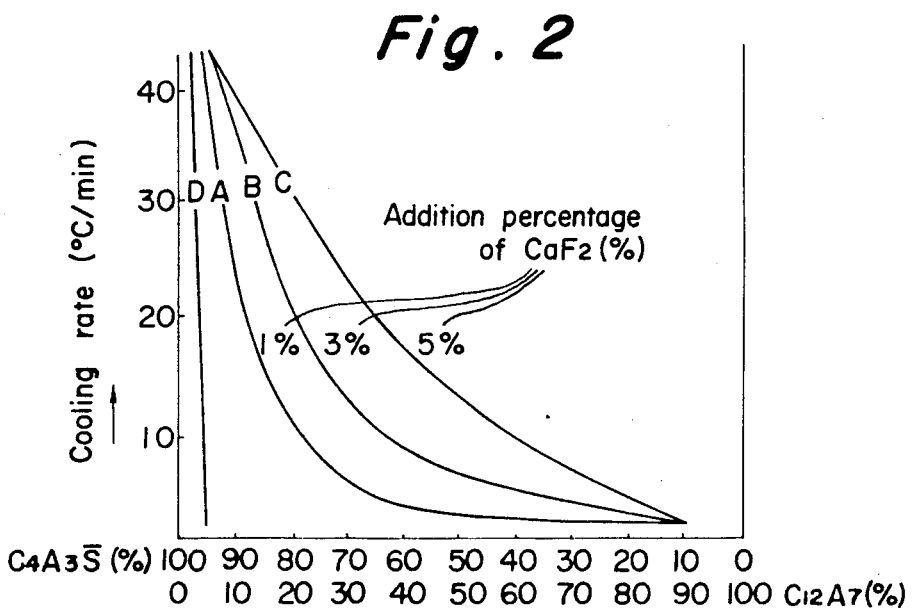
FIG. 2 is a graph showing the relation of the cooling rate of the fused body to the resulting mineral composition.
Figure 3:
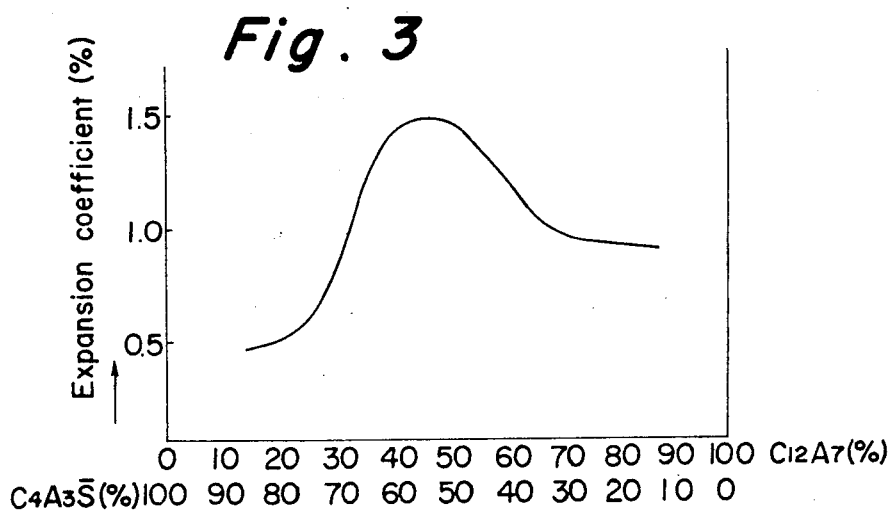
FIG. 3 is a graph showing the relation of the resulting mineral composition to the expansion coefficient.
Figure 4:
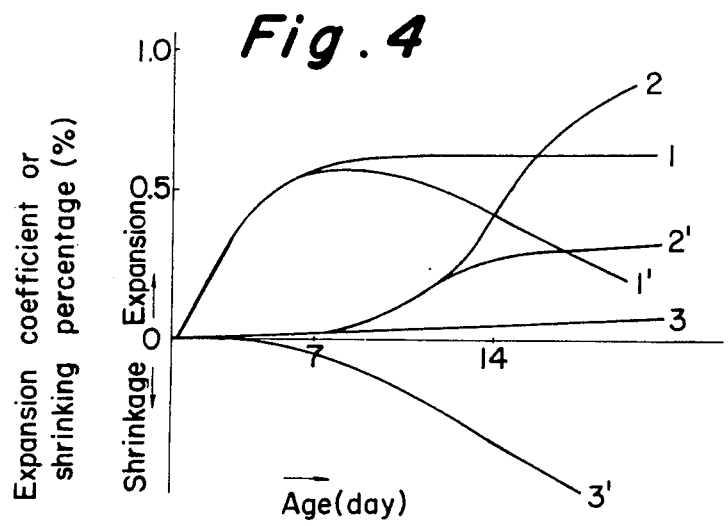
FIG. 4 is a graph showing the relation of the age to the expansion coefficient, which shows the quality of the expansive cement.

Each raw mixture was put in a platinum dish and fused at 1,400°C in an electric resistance furnace provided with a carborundum heating element. Then, the load electric power of the furnace was gradually decreased or stopped to control variously the cooling rate within the range of 2° to 50°C/min. The amounts of C$_{12}$A$_7$ and C$_4$A$_3\overline{S}$ of the resulting cooled products were determined by means of a X-ray diffraction method. Relations between the cooling rate with the composition ratio of C$_{12}$A$_7$ to C$_4$A$_3\overline{S}$ are shown in FIG. 2. The cement expanding agents having predetermined composition ratios of C$_{12}$A$_7$ to C$_4$A$_3\overline{S}$ were pulverized to a Blaine specific surface of about 1,700 cm$^3$/g and 7 percent by weight of each pulverized expanding agent was compounded with ordinarily used Portland cement so that the total amount of the resulting expansive cement was 100 percent by weight. The expansion coefficient of the cement was measured by the use of a mortar briquet by means of a dial gauge according to the method described in JIS R 5201. The expansion coefficient of the briquet after 2 week age is shown in FIG. 3.

EXAMPLE 5

The same raw mixture as described in Example 1 was tested by means of a Girod electric furnace capable of inclining and rotating and having a maximum load power of 450 KVA. The electric furnace was provided with one cylindrical carbon electrode having a diameter of 257 mm.

10 Kg of natural fluorite and a small amount of charcoal were firstly placed under the electrode and arc was generated to prepare a fused body at a temperature of 1,190°C, and then a raw mixture which had previously been prepared was gradually added thereto. It was confirmed from the analysis of the shape of pulsating current by an oscilloscope that a directly heating electric resistance furnace was formed. As the addition of the raw mixture proceeded, a pool formed by the fused body was larger and the temperature of the fused body reached 1,370°C. Then 70 to 80 percent of the fused body forming the pool was tapped from the furnace, and the raw mixture was further charged to the furnace. This procedure was repeated and the furnace was kept under a stable condition. In this case, the electric condition was as follows:

The primary voltage) $V_1 = 2,200$ Volt
The primary current $I_1 = 25$ Amp.
The secondary voltage $V_2 = 55$ Volt and
The secondary current $I_2$ was calculated to be 1,000 Amp. without considering the power-factor.

The average load power was calculated to be approximately 55 KW, and the electrode current density CD was calculated to be 1.97 Amp./cm² from the following formula 1

$$CD = I_2/\pi r^2 \qquad 1.$$

In the above formula 1, $r$ (cm) represents the radius of the electrode.

The resistivity $\rho$ of the fused body in the furnace was calculated to be 1.86 $\Omega$-cm from the following formula 2.

$$\rho = R\pi r^2/h = V_2\pi r^2/I_2 h \qquad 2.$$

Figure 6:
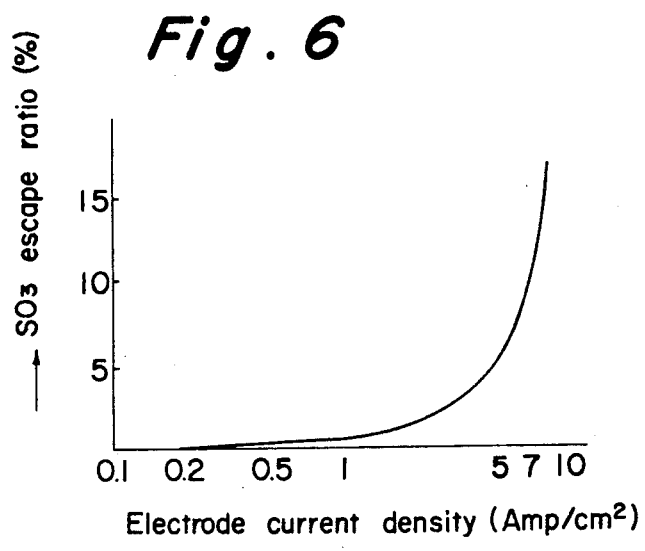
FIG. 6 is a graph showing the relation of the electrode current density of $SO_3$ escape ratio.

In the above formula 2, R represents the resistance value in the furnace, and $h$ (cm) represents the distance between the lower end of the electrode and the bottom of the furnace. The most stable operation was able to be generally effected in the case that the distance $h$ was 15 cm. As the result of experiments at various distances, it was found that an electrode current density ranging from 0.2 to 7.0 Amp./cm² was most advantageous for the operation. When the density was less than 0.2 Amp./cm², the furnace efficiency is considerably low, while the density was about 8.0 Amp./cm², a large amount of sulfuric acid anhydride was escaped. The result is shown in FIG. 6.

A test was made with respect to the voltage at the top of the electrode ranging from 20 to 400 V. When the voltage was higher than 400 V, arc was formed and a large amount of sulfuric acid anhydride was escaped and consequently stable operation was impossible, while when the voltage was lower than 20 V, the furnace efficiency was low. The term "furnace efficiency" herein described is shown by the amount (ton) of product per 1,000 KWD of consumed electric power. When continuous operations were effected in both of Example 1 and this Example 5, the furnace efficiency was 35 to 55.

EXAMPLE 6

Raw mixtures having a chemical composition outside the range of the present invention were prepared from raw materials having the same composition as shown in Table 1 and fluorite in the compounding recipe as shown in the following Table 6. The fluorite was compounded in an amount based on the weight of a mixture of the raw materials only. In Table 6, the numeral means percent by weight.

Table 6

| Experiment | Quick lime | Bauxite | Gypsum | Fluorite |
|---|---|---|---|---|
| No I | 58.9 | 21.8 | 19.3 | 23 |
| II | 7.1 | 3.4 | 89.5 | 3 |
| III | 9.6 | 42.9 | 47.5 | 15 |
| IV | 19.2 | 1.1 | 79.7 | 5 |
| V | 66.6 | 3.9 | 29.5 | 20 |
| VI | 22.2 | 49.6 | 28.2 | 15 |
| VII | 6.7 | 14.7 | 78.6 | 1 |

The above described seven raw mixtures were fused in the directly heating electric resistance furnace used in Example 5 under the same condition as described in Example 5.

Temperatures of the fused bodies were measured by means of an optical pyrometer. The temperature in experiment No. I was 1,510°C, that in experiment No. V was 1,570°C and that in experiment No. VI was 1,400°C. In experiment Nos. I, V and VI, though the raw mixture contained a large amount of fluorite, the fluidity of the fused body was considerably poor. The temperatures of the fused bodies in experiment Nos. II, III, IV and VII were within the range of 1,180° to 1,450°C.

Chemical compositions of the fused bodies are shown in the following Table 7. In Table 7, the numeral means percent by weight.

Table 7

| Experiment No. | Insoluble | $Al_2O_3$ | $SO_3$ | CaO | $SiO_2$ | $Fe_2O_3$ | $F_2$ | Others | Total |
|---|---|---|---|---|---|---|---|---|---|
| I | 5.8 | 12.2 | 3.1 | 67.0 | 1.4 | 2.2 | 4.4 | 3.3 | 99.4 |
| II | 0.2 | 2.1 | 50.7 | 43.1 | 0.4 | 0.5 | 0.8 | 1.2 | 99.0 |
| III | 24.9 | 7.7 | 26.0 | 31.3 | 2.7 | 1.6 | 3.4 | 1.3 | 99.2 |
| IV | 0.5 | 0.7 | 46.1 | 49.8 | 0.2 | 0.5 | 1.3 | 1.1 | 98.9 |
| V | 0.1 | 4.1 | 7.8 | 80.6 | 2.2 | 0.9 | 3.4 | 0.8 | 99.9 |
| VI | 23.9 | 19.9 | 3.2 | 40.2 | 3.2 | 3.0 | 3.3 | 2.2 | 98.9 |
| VII | 2.8 | 10.1 | 45.4 | 37.4 | 0.8 | 0.9 | – | 0.7 | 98.1 |

In the experiment Nos. I, V and VI, a large amount of sulfuric acid anhydride was escaped, and particularly in the experiment Nos. III and VI, a large amount of unreacted $Al_2O_3$ was remained, and consequently stable operation was not able to be effected for a long period of time.

In the experiment No. II, fusion was able to be effected, but a major part of the fused body is gypsum and such a composition is not suitable to be used as a cement expanding agent.

In the experiment Nos. IV and VII, fusion itself was able to be effected stably, but the tapping was difficult. Further, in the cement expanding agent containing more than 20 percent by weight of fluorite as shown in experiment No. I, the expansion coefficient was considerably low.

EXAMPLE 7

Each of the four cement expanding agents obtained by the four cooling processes in Example 1, that is, each cooled body having an X-ray diffraction pattern shown in FIG. 5A, 5B, 5C or 5D was pulverized to a Blaine specific surface of 2,300 cm³/g. 9 percent by weight of the pulverized cooled product was added to ordinarily used Portland cement so that the total amount was 100 percent to prepare an expansive cement.

The expansion coefficient of the resulting expansive cement was measured by the use of a mortar briquet of 4×4×16 cm according to JIS R 5201. The expansive cement was mixed with sand in a ratio of cement: and = 1:2 and further with water in a water cement ratio of 60 percent, and then the resulting mixture was introduced into a frame having the above dimension and taken out from the frame after cured for 1 day in moist air to obtain the briquet. The expansion coefficient was measured by a comparator on the base of the length of the briquet. Curing of the briquet was effected in water at 20°C.

The result of the measurement of the expansion coefficient is shown in the following Table 8. In Table 8, the numeral means percent.

Table 8

| Sample | Age (day) | | | | | | |
|---|---|---|---|---|---|---|---|
| | 1 | 2 | 4 | 7 | 14 | 21 | 28 |
| (A) | 0.413 | 0.810 | 1.463 | 1.480 | 1.480 | 1.491 | 1.491 |
| (B) | 0.052 | 0.082 | 0.163 | 0.328 | 0.442 | 0.598 | 0.061 |
| (C) | 0.023 | 0.033 | 0.048 | 0.095 | 0.101 | 0.112 | 0.127 |
| (D) | 0.017 | 0.020 | 0.033 | 0.047 | 0.095 | 0.108 | 0.114 |

EXAMPLE 8

In order to clarify the characteristic feature of the present invention, a conventional cement expanding agent obtained by sintering the same raw mixture as described in Example 1 by means of a rotary kiln and the cement expanding agent B in Example 7 were compared under the same condition. 12 percent by weight of each expanding agent was compounded with ordinarily used Portland cement so that the total amount was 100 percent to prepare an expansive cement. Concrete was prepared from the expansive cement in the compounding recipe as shown in the following Table 9.

Table 9

| W/C (%) | Slump (cm) | Sand ratio (%) | Available water (Kg/m³) | Cement (Kg/m³) | Sand (Kg/m³) | Gravel (Kg/m³) |
|---|---|---|---|---|---|---|
| 60 | 19 | 47.8 | 190 | 317 | 885 | 965 |

The expansion coefficient of the concrete was measured by the use of rectangular prism briquets of 10×10×40 cm having steel ratios of 0, 0.4 and 1.2 percent. The concrete was introduced into a frame having the above dimension, wherein a PC steel rod was arranged in the center portion of the frame along the longitudinal direction of the frame and both ends of the steel rod were fused to flat iron plates of the frame, and taken out from the frame after 24 hours to obtain the briquet. Two points $a$ and $b$ were marked on the briquet, and the briquet was cured in water at 20°C for 1 week in a room of RH 80 percent for 4 weeks and then in water for 1 week. The ratio of the length between the points $a$ and $b$ of the cured briquet to that of the original briquet was measured, which was expansion coefficient. The result of the expansion coefficient measurement is shown in the following Table 10. In Table 10, the numeral means percent, and the sign (−) means shrinkage.

Table 10

| | Steel ratio (%) | In water | | | In a room | | In water |
|---|---|---|---|---|---|---|---|
| | | 2 days | 7 days | 21 days | 35 days | 36 days | 42 days |
| Kiln process (control) | 0 | 0.013 | 0.097 | 0.070 | 0.055 | 0.083 | 0.083 |
| | 0.4 | 0.009 | 0.034 | 0.012 | −0.014 | 0.013 | 0.014 |
| | 1.2 | 0.004 | 0.017 | 0.000 | −0.018 | 0.008 | 0.008 |
| Present invention (expanding agent B) | 0 | 0.015 | 0.075 | 0.070 | 0.060 | 0.074 | 0.075 |
| | 0.4 | 0.007 | 0.056 | 0.042 | 0.033 | 0.050 | 0.050 |
| | 1.2 | 0.005 | 0.033 | 0.018 | 0.008 | 0.025 | 0.028 |

The compression strength and the Young's modulus of the concrete are shown in the following Table 11.

Table 11

| | Compression strength (Kg/cm²) | | | Young's modulus (Kg/cm²) |
|---|---|---|---|---|
| | 1 week (7 days) | 5 weeks (35 days) | 6 weeks (42 days) | 6 weeks (42 days) |
| kiln process (control) | 109 | 221 | 165 | 2.11×10⁵ |
| Present Invention (expanding agent B) | 150 | 268 | 224 | 3.20×10⁵ |

The above described strength tests were effected by the use of a cylindrical briquet of 15φ × 30cm, which was prepared in an iron frame and cured as such in the same manner as described above.

EXAMPLE 9

Raw materials having the same composition as shown in Table 1 were used. To a mixture of 14.4 percent by weight of quick lime, 17.0 percent by weight of bauxite and 68.6 percent by weight of gypsum was added 3 percent by weight, based on the weight of the mixture, of cryolite to obtain a raw mixture. The resulting raw mixture was fused in the same electric furnace as described in Example 1. The temperature of the fused body was 1,290°C. The fused body was tapped from the furnace into the same double-walled iron ladle as described in the process 1 of Example 1 and cooled gradually.

Chemical composition of the resulting cooled product is shown in the following Table 12. In Table 12, the numeral means percent by weight.

Table 12

| Insoluble | $Al_2O_3$ | CaO | $SO_3$ | $SiO_2$ | $Fe_2O_3$ | Others | F-CaO |
| --- | --- | --- | --- | --- | --- | --- | --- |
| 0.1 | 16.5 | 42.4 | 36.0 | 1.2 | 0.7 | 2.8 | 1.7 |

The above described cooled product was added with 0.5 percent by weight of $CaCl_2$ and pulverized to a Blaine specific surface of 6,000 cm³/g. 7.0 percent by weight of the resulting mixture was added to rapid hardening Portland cement (corresponding to ASTM, C 150 TYP III) so that the total amount was 100 percent to prepare an expansive cement. As to the strength of the expansive cement, a mortar briquet was prepared according to JIS R 5201 and cured 1 day in moist air, and the strength of the briquet was measured to obtain a result as shown in the following Table 13.

As a control, the strength of Dreifach Z 475 (trademark, made by Dycker Hoff Co., Germany) was measured in the same manner. The result is also shown in Table 13.

Table 13

| | Strength (Kg/cm²) | | Time of setting | |
| --- | --- | --- | --- | --- |
| | Compression | Bending | Initial set | Final set |
| | | | hrs. – min. | hrs. – min. |
| Present invention | 240 | 50 | 2 – 25 | 3 – 15 |
| JIS rapid hardening Portland cement | 130 | 30 | 2 – 19 | 3 – 20 |
| Dreifach Z 475 | 230 | 50 | 2 – 14 | 3 – 05 |

The expansion coefficient and shrinking percentage of the above described briquet, when cured in moist air at 20°C, are shown in the following Table 14. In Table 14, the numeral in the paretheses means the case when the briquet was cured in water at 20°C, and the sign (−) means shrinkage.

Table 14

| | 1 day | 2 days | 4 days | 7 days | 14 days | 21 days |
| --- | --- | --- | --- | --- | --- | --- |
| Present invention | 0.018 (0.035) | 0.001 (0.048) | −0.021 (0.093) | −0.030 (0.104) | −0.048 (0.127) | −0.051 (0.131) |
| JIS rapid hardening Portland cement | −0.007 (0.001) | −0.025 (0.007) | −0.045 (0.000) | −0.062 (0.002) | −0.095 (0.004) | −0.109 (0.006) |
| Dreifach Z 475 | −0.012 (0.004) | −0.024 (0.008) | −0.047 (0.003) | −0.060 (0.006) | −0.097 (0.012) | −0.115 (0.011) |

EXAMPLE 10

The conventional cement expanding agent used in Example 8, which had substantially the same chemical composition as that of the cement expanding agent according to the present invention and was obtained by sintering in a rotary kiln, and the cement expanding agent according to the present invention were compared with respect to the weathering property.

Each expanding agent, which was previously pulverized to a Blaine specific surface of 1,700 cm³/g, was left to stand in air, and the percentage of weight increased was measured to obtain a result as shown in the following Table 15.

Table 15

| | Percentage of weight increased (%) | | | |
| --- | --- | --- | --- | --- |
| Lapse of time (day) | Conventional cement expanding agent | Cement expanding agent of the present invention | | |
| | | (A) | (B) | (C) |
| 3 | 2.0 | 0.2 | 0.4 | 0.0 |
| 7 | 5.2 | 0.6 | 0.8 | 0.2 |
| 10 | 6.7 | 0.9 | 1.3 | 0.5 |

After each of the above described expanding agents was left to stand for 10 days in air, a mortar briquet was produced according to JIS R 5201 in the same manner as described in Example 7, and the expansion coefficient of the briquet was measured. In the conventional expanding agent, the expansion efficient after cured 3 days in water was about 50 percent based on the expansion coefficient before weathering. However, in the expanding agent according to the present invention, the expansion coefficient was not substantially decreased.

EXAMPLE 11 the expansion coefficient

Raw materials having the same compositions as shown in Table 1 were used. To a mixture of 55 percent by weight of quick lime, 6 percent by weight of bauxite and 39 percent by weight of gypsum was added 8% by weight, based on the weight of the mixture, of cryolite to prepare a raw mixture. The raw mixture was fused in the same directly heating electric resistance furnace as used in Example 5. The temperature of the fused body was 1,380°C and the fused body had a good fluidity. The fused body was quenched by blowing with compressed air under the same condition as described in the process 3 of Example 1. Chemical composition of the quenched product is shown in the following Table 16. In Table 16, the numeral means percent by weight.

scribed in Example 8. That is, the above described concrete was introduced into a frame having the above dimension, left to stand for 3 hours in a room, heated up to 65°C with steam at a rate of 15°C/hr. together with the frame, kept at this temperature for 3 hours, cooled to 20°C at a rate of 15°C/hr. and then taken out from the frame to obtain the briquet. Two points $a$ and $b$ were marked on the briquet, and the briquet was cured in water at 20°C for 1 week and then left to stand for 4 weeks in a room. The expansion coefficient was shown by the ratio of the length between the points $a$ and $b$ of the cured briquet to that of the original briquet measured by a dial gauge. The obtained result is shown in the following Table 18. In Table 18, the numeral means percent.

As a control, concretes were prepared by the use of the cement expanding agents A and B in Example 7, and the expansion coefficients of these concretes were measured in the same manner as described above. The result is also shown in Table 18.

Table 18

|  | Curing in water | | | | Left to stand in a room | | |
| --- | --- | --- | --- | --- | --- | --- | --- |
|  | 1 day | 2 days | 4 days | 7 days | 2 weeks | 3 weeks | 4 weeks |
| Example 11 | 0.127 | 0.127 | 0.134 | 0.136 | 0.129 | 0.123 | 0.120 |
| Example 7 | | | | | | | |
| (A) | 0.010 | 0.013 | 0.015 | 0.015 | 0.003 | 0.003 | 0.003 |
| (B) | 0.041 | 0.043 | 0.048 | 0.045 | 0.027 | 0.027 | 0.024 |

As seen from Table 18, when the expansive cement in this Example 11, which contains the quenched cement expanding agent, is used in the production of secondary cement products or shaped articles, such as lining of iron pipe and Hume concrete pipe, which require curing with steam, cement products or shaped articles having an improved chemical prestress can be obtained, and further cracks of lining can be prevented, Table 16

| Insoluble | $Al_2O_3$ | CaO | $SO_3$ | $SiO_2$ | $Fe_2O_3$ | Others | Total |
| --- | --- | --- | --- | --- | --- | --- | --- |
| 0.2 | 6.1 | 69.2 | 18.8 | 1.6 | 0.7 | 3.4 | 100.0 |

The quenched product was pulverized to a Blaine specific surface of about 1,700 cm³/g. 13 parts by weight of the pulverized quenched product was added to 87 parts by weight of ordinarily used Portland cement to prepare an expansive cement. Concrete was prepared from the expansive cement in the compounding recipe as shown in the following Table 17.

and strength of the shaped articles can be increased.

What is claimed is:

1. A process for producing cement expanding agents having a mineral composition predominantly of 12 $CaO \cdot 7Al_2O_3 \cdot CaO \cdot CaSO_4$, which comprises fusing at temperature of from 1,100° to 1,450°C. a raw material mixture having a weight ratio of $CaO/Al_2O_3$ of 0.5 to 20 and containing 30 to 80 percent by weight of $CaSO_4$ and 0.2 to 20 percent by weight of an inorganic fluoride in a directly heating resistance furnace at an electrode AC voltage of 20 to 400 V and an electrode current Table 17

| Maximum dimension of coarse aggregate (mm) | Slump (cm) | Air (%) | Water (Kg/m³) | Cement (Kg/m³) | Water cement ratio (%) | Fine aggregate (%) | Fine aggregate (Kg/m³) | Coarse aggregate (Kg/m³) |
| --- | --- | --- | --- | --- | --- | --- | --- | --- |
| 25 | 5 | 1.5 | 172 | 350 | 49.2 | 41 | 728 | 1,047 |

The expansion coefficient of the thus obtained concrete was measured by the use of a briquet of 10×10×40 cm, which held a PC steel rod of 11 mm$\phi$ in a steel ratio of 1.0 percent in the same manner as dedensity of 0.8 to 8.0 Amp./cm² to form a fused body, and cooling the fused body by an insulated cooling.

2. A process for producing cement expanding agents having a mineral composition predominantly of 12 CaO·7Al₂O₃·CaSO₄, which comprises fusing at a temperature of from 1,100° to 1,450°C. a raw material mixture having a weight ratio of CaO/Al₂O₃ of 0.8 to 2.0 and a containing 50 to 70 percent by weight of CaSO₄ and 0.2 to 5 percent by weight of an inorganic fluoride in a directly heating resistance furnace at an electrode AC voltage of 20 to 400 V and an electrode current density of 0.8 to 8.0 Amp./cm² to form a fused body and cooling the fused body by an insulated cooling.

3. A process for producing cement expanding agents of an amorphous product which comprises fusing at a temperature of from 1,100° to 1,450°C a raw material mixture having a weight ratio of CaO/Al₂O₃ of 0.5 to 20 and containing 30 to 80 percent by weight of CaSO₄ and 0.2 to 20 percent by weight of an inorganic fluoride in a directly heating resistance furnace at an electrode AC voltage of 20 to 400 V and an electrode current density of 0.8 to 8.0 Amp./cm² to form a fused body and cooling the fused body with water.

4. The process as claimed in claim 1, wherein said insulated cooling is by allowing said fused body to cool in an area insulated from ambient conditions.

5. The process as claimed in claim 2, wherein said insulated cooling is by allowing said fused body to cool in an area insulated from ambient conditions.

Figure 1:
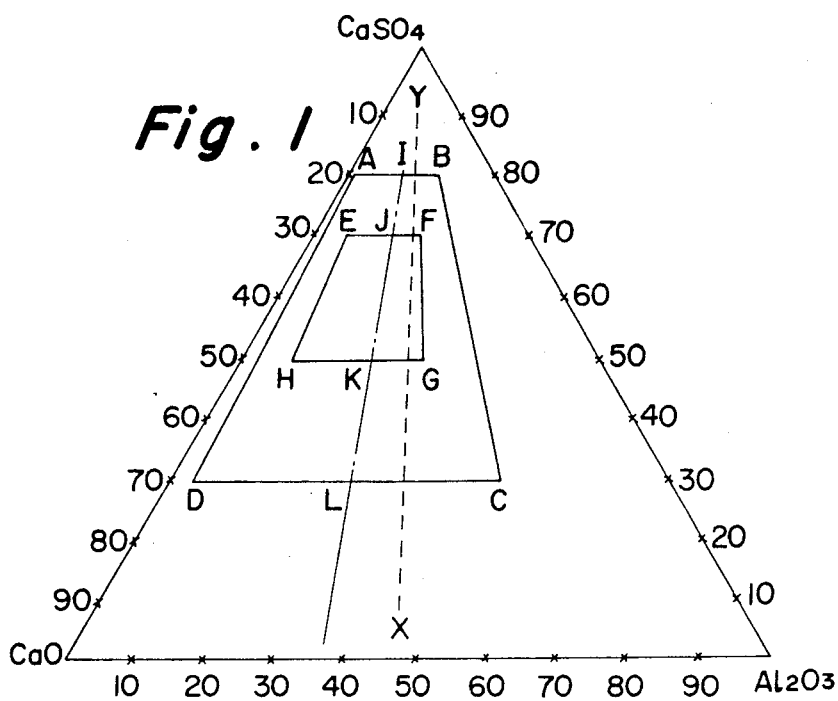
FIG. 1 is a graph showing the chemical composition range of the present invention.

6. The process as claimed in claim 1, wherein the amount of CaSO₄, Al₂O₃ and CaO in said raw material mixture is within the area of EJKH in FIG. 1 and the amount of the inorganic fluoride in said raw material mixture is 0.2 to 5 percent by weight.

7. The process as claimed in claim 2, wherein the amount of CaSO₄, Al₂O₃ and CaO in said raw material mixture is on the line X–Y of FIG. 1.

8. The process as claimed in claim 1, wherein the alumina raw material has an average grain size of less than 5 mm and a pore volume of 0.05 to 0.5 cm³/g and the calcium oxide raw material has an average grain size of 1 to 10 times the average grain size of the alumina.

9. The process as claimed in claim 2, wherein the alumina raw material has an average grain size of less than 5 mm and a pore volume of 0.05 to 0.5 cm³/g and the calcium oxide raw material has an average grain size of 1 to 10 times the average grain size of alumina.

10. The process as claimed in claim 3, wherein the alumina raw material has an average grain size of less than 5 mm and a pore volume of 0.05 to 0.5 cm³/g and the calcium oxide raw material has an average grain size of 1 to 10 times the average grain size of alumina.

* * * * *